United States Patent
Kelso et al.

(10) Patent No.: US 10,614,300 B2
(45) Date of Patent: Apr. 7, 2020

(54) FORMATTING HANDWRITTEN CONTENT

(71) Applicant: Lenovo (Singapore) Pte. Ltd., Singapore (SG)

(72) Inventors: Scott Edwards Kelso, Cary, NC (US); John Weldon Nicholson, Cary, NC (US); Bradley Park Strazisar, Cary, NC (US); Steven Richard Perrin, Raleigh, NC (US); Jianbang Zhang, Cary, NC (US); Sarah Jane E Cox, Raleigh, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 178 days.

(21) Appl. No.: 14/580,741

(22) Filed: Dec. 23, 2014

(65) Prior Publication Data

US 2016/0179764 A1 Jun. 23, 2016

(51) Int. Cl.
*G06F 17/00* (2019.01)
*G06K 9/00* (2006.01)
*G06F 3/0488* (2013.01)
*G06F 17/21* (2006.01)
*G06F 17/24* (2006.01)

(52) U.S. Cl.
CPC ..... *G06K 9/00416* (2013.01); *G06F 3/04883* (2013.01); *G06F 17/211* (2013.01); *G06F 17/242* (2013.01)

(58) Field of Classification Search
CPC .. G06F 3/04883; G06F 17/242; G06F 17/211; G06K 9/00416

USPC ......................................... 715/263, 268, 244
See application file for complete search history.

(56) References Cited

U.S. PATENT DOCUMENTS

| | | | | |
|---|---|---|---|---|
| 5,396,566 A | * | 3/1995 | Bruce | G06K 9/3283 382/187 |
| 5,528,743 A | * | 6/1996 | Tou | G06F 17/25 345/179 |
| 5,539,427 A | * | 7/1996 | Bricklin | G06F 16/5854 345/622 |
| 5,583,542 A | * | 12/1996 | Capps | G06F 3/04842 345/173 |
| 5,590,257 A | * | 12/1996 | Forcier | G06F 3/0488 715/273 |

(Continued)

OTHER PUBLICATIONS

Kasirajan et al., PATRAM: A Unified Word Processing System for Handwritten Characters in Indian Languages, IEEE 2007, pp. 1-5.*

(Continued)

*Primary Examiner* — Cong-Lac Huynh
(74) *Attorney, Agent, or Firm* — Ference & Associates LLC

(57) ABSTRACT

One embodiment provides a method, including: accepting, in an input and display device, handwriting ink strokes; providing, using a handwriting recognition engine, one or more machine words for the one or more ink strokes; determining a characteristic of the one or more handwriting ink strokes; changing, based on the characteristic of the handwriting ink strokes, input formatting for the one or more machine words; and inputting the one or more machine words according to the input formatting. Other embodiments are described and claimed.

20 Claims, 9 Drawing Sheets

(56) References Cited

U.S. PATENT DOCUMENTS

| | | | | |
|---|---|---|---|---|
| 5,613,019 | A * | 3/1997 | Altman | G06F 3/04883 382/189 |
| 5,652,806 | A * | 7/1997 | Friend | G06K 9/2054 382/175 |
| 5,825,919 | A * | 10/1998 | Bloomberg | G06K 9/00463 382/171 |
| 5,864,635 | A * | 1/1999 | Zetts | G06K 9/00416 382/187 |
| 6,021,218 | A * | 2/2000 | Capps | G06K 9/222 382/187 |
| 7,120,872 | B2 * | 10/2006 | Thacker | G06F 3/0481 382/181 |
| 7,397,950 | B2 * | 7/2008 | Shilman | G06K 9/222 382/103 |
| 7,502,017 | B1 * | 3/2009 | Ratzlaff | G06F 3/04883 345/173 |
| 7,533,338 | B2 * | 5/2009 | Duncan | G06F 17/211 707/999.104 |
| 7,551,779 | B2 * | 6/2009 | Garside | G06F 3/04883 382/186 |
| 7,580,551 | B1 * | 8/2009 | Srihari | G06K 9/00161 340/5.52 |
| 7,590,535 | B2 * | 9/2009 | Williamson | G10L 15/22 345/157 |
| 7,680,332 | B2 * | 3/2010 | Ye | G06K 9/00416 382/186 |
| 7,693,842 | B2 * | 4/2010 | Hinckley | G06F 17/30864 382/186 |
| 8,074,184 | B2 * | 12/2011 | Garside | G06F 17/242 382/186 |
| 8,407,589 | B2 * | 3/2013 | Ye | G06K 9/00409 715/262 |
| 8,875,016 | B2 * | 10/2014 | Saund | G06K 9/00463 715/256 |
| 9,390,715 | B2 * | 7/2016 | Jeon | G06F 3/167 |
| 9,524,428 | B2 * | 12/2016 | Nicholson | G06K 9/00409 |
| 9,727,535 | B2 * | 8/2017 | Maloney | G06F 17/211 |
| 9,922,014 | B2 * | 3/2018 | Kim | G06F 17/241 |
| 2002/0097909 | A1 * | 7/2002 | Perrone | G06K 9/222 382/187 |
| 2003/0123733 | A1 * | 7/2003 | Keskar | G06F 3/002 382/187 |
| 2003/0215136 | A1 * | 11/2003 | Chao | G06K 9/3283 382/176 |
| 2003/0215139 | A1 * | 11/2003 | Shilman | G06K 9/00409 382/186 |
| 2004/0017375 | A1 * | 1/2004 | Lui | G06F 17/242 345/581 |
| 2005/0114773 | A1 * | 5/2005 | Thacker | G06F 3/0481 715/263 |
| 2005/0128181 | A1 * | 6/2005 | Wang | G06K 9/00436 345/156 |
| 2005/0135678 | A1 * | 6/2005 | Wecker | G06F 3/04883 382/186 |
| 2006/0050969 | A1 * | 3/2006 | Shilman | G06F 3/04883 382/224 |
| 2006/0078202 | A1 * | 4/2006 | Shilman | G06K 9/222 382/186 |
| 2006/0167902 | A1 * | 7/2006 | Bhattacharyay | G06K 9/22 |
| 2006/0218171 | A1 * | 9/2006 | Wakeam | G06K 9/00409 |
| 2007/0250497 | A1 * | 10/2007 | Mansfield | G06F 17/30731 |
| 2012/0121181 | A1 * | 5/2012 | Markiewicz | G06F 3/0237 382/186 |
| 2012/0189205 | A1 * | 7/2012 | Tonouchi | G06K 9/00422 382/187 |
| 2014/0245137 | A1 * | 8/2014 | Kim | G06F 17/241 715/268 |
| 2014/0300609 | A1 * | 10/2014 | Kang | G06F 3/04883 345/467 |
| 2015/0067593 | A1 * | 3/2015 | Henerlau | G06F 3/04883 715/808 |
| 2015/0169975 | A1 * | 6/2015 | Kienzle | G06K 9/34 382/189 |
| 2015/0302242 | A1 * | 10/2015 | Lee | G06K 9/00442 382/189 |
| 2016/0132232 | A1 * | 5/2016 | Baba | G06K 9/00402 715/268 |
| 2016/0232146 | A1 * | 8/2016 | Su | G06F 17/242 |
| 2017/0060406 | A1 * | 3/2017 | Rucine | G06F 3/0236 |
| 2017/0091153 | A1 * | 3/2017 | Thimbleby | G06F 17/212 |
| 2017/0236004 | A1 * | 8/2017 | Sugiura | G06F 17/242 382/189 |
| 2018/0293908 | A1 * | 10/2018 | Wang | G06K 9/00429 |

OTHER PUBLICATIONS

Yao et al., Detecting Texts of Arbitrary Orientations in Natural Images, IEEE 2012, pp. 1083-1090.*

Hossain et al., Rapid Feature Extraction for Bangla Handwritten Digit Recognition, IEEE 2011, pp. 1832-1837.*

Tappert et al., the State of the Art in Online Handwriting Recognition, IEEE 1990, pp. 787-808.*

Shilman et al., Discerning Structure from Freeform Handwritten Notes, IEEE 2003, pp. 1-6.*

Aparna et al., Online Handwriting Recognition for Tamil, IEEE 2004, pp. 1-6.*

Jain et al., Structure in On-line Documents, IEEE 2001, pp. 844-848. (Year: 2001).*

Li et al., Script-Independent Text Line Segmentation in Freestyle Handwritten Documents, IEEE, pp. 1313-1329. (Year: 2008).*

Bargeron et al., Reflowing Digital Ink Annotations, ACM 2003, pp. 385-392. (Year: 2003).*

Shilman et al., Discerning Structure from Freeform Handwritten Notes, IEEE 2003, pp. 1-6. (Year: 2003).*

Taconet et al., Text Line Segmentation of Historical Documents: A Survey, Springer 2006, pp. 123-138. (Year: 2006).*

* cited by examiner

FORMATTING HANDWRITTEN CONTENT

BACKGROUND

Information handling devices ("devices"), for example cell phones, smart phones, tablet devices, laptop computers, and the like permit users to input handwriting using a finger or pen/stylus. This allows users to write more naturally and without the use of a keyboard.

Conventionally a handwriting field, box or pane is presented to the user as an overlay, e.g., a rectangle in a lower portion of a touch screen display. In this area the user may provide input handwriting strokes, e.g., letters, numbers, characters, symbols, etc. The device employs software that uses the input handwriting strokes, which are generally presented on screen to provide visual feedback to the user, as input by converting the handwriting stroke input locations on the touch screen into machine text according to the language setting of the device. Alternatively, a graphic or image of handwriting input may be placed into an underlying application, e.g., an image of the user's signature.

BRIEF SUMMARY

In summary, one aspect provides a method, comprising: accepting, in an input and display device, handwriting ink strokes; providing, using a handwriting recognition engine, one or more machine words for the one or more ink strokes; determining a characteristic of the one or more handwriting ink strokes; changing, based on the characteristic of the handwriting ink strokes, input formatting for the one or more machine words; and inputting the one or more machine words according to the input formatting.

Another aspect provides an apparatus, comprising: an input and display device; a processor operatively coupled to the input and display device; and a memory device that stores instructions executable by the processor to: accept, in the input and display device, handwriting ink strokes; provide, using a handwriting recognition engine, one or more machine words for the one or more ink strokes; determine a characteristic of the one or more handwriting ink strokes; change, based on the characteristic of the handwriting ink strokes, input formatting for the one or more machine words; and input the one or more machine words according to the input formatting.

A further aspect provides a product, comprising: a storage device having code stored therewith, the code being executable by a processor of an electronic device and comprising: code that accepts, in an input and display device, handwriting ink strokes; code that provides, using a handwriting recognition engine, one or more machine words for the one or more ink strokes; code that determines a characteristic of the one or more handwriting ink strokes; code that changes, based on the characteristic of the handwriting ink strokes, input formatting for the one or more machine words; and code that inputs the one or more machine words according to the input formatting.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
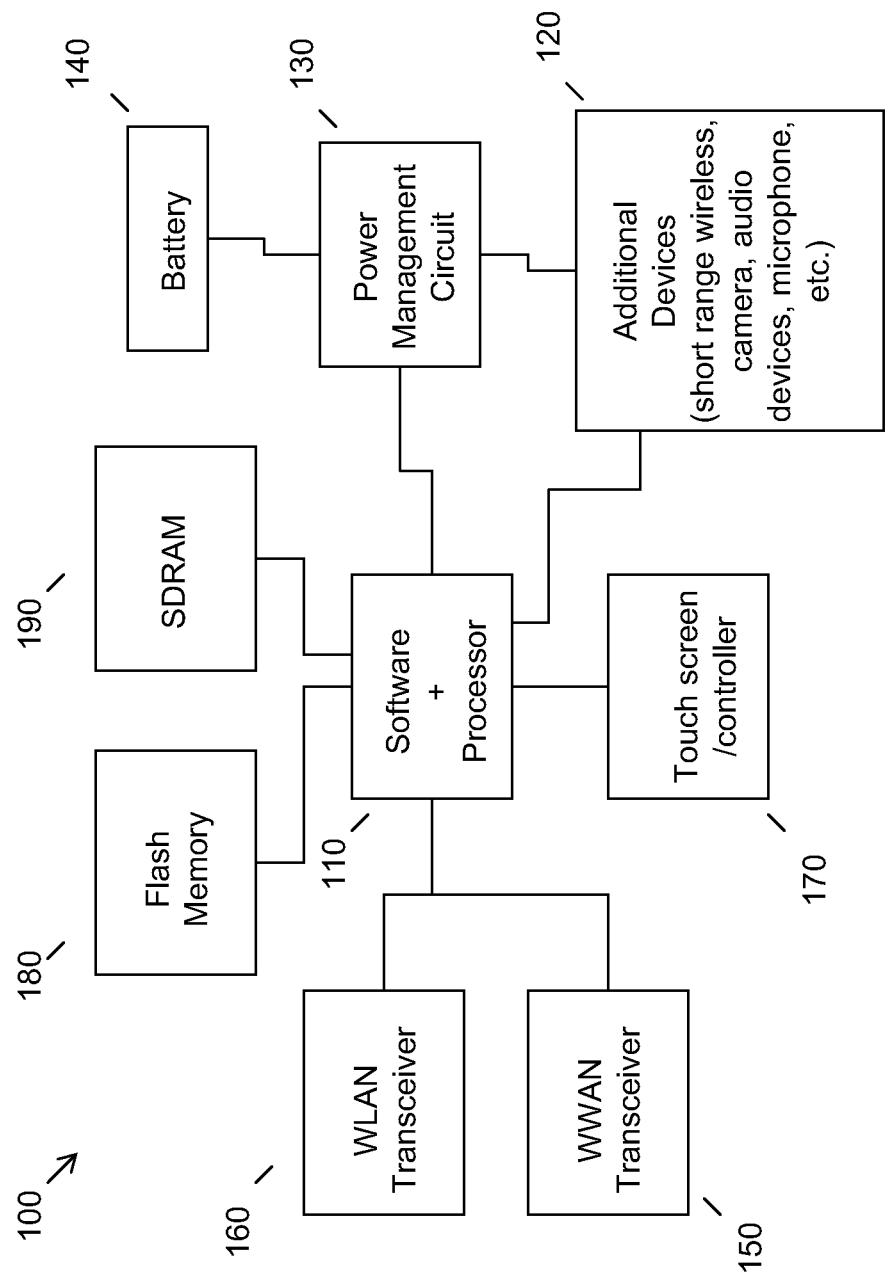
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Properly converting the structure of a handwritten document to machine form input (machine text, machine words, or herein simply referred to as "typeset") is difficult. Paragraphs, lists, tables, and other structural elements are created visually by their division in to blocks and the relative positioning of those blocks on the page. There are few unequivocal indicators in the handwriting script of the user's intent.

Input method editors (IMEs) and applications that natively support handwriting inputs do not attempt to analyze or understand the document structure of the handwritten content and simply record the handwriting as it was written, e.g., in the original graphical form. This is the default behavior for EVERNOTE and ONENOTE applications. For the purpose of searching, the handwriting may be converted by such applications to machine text, as a background task and out of sight of the user, where understanding the document structure is not so important. EVERNOTE is a registered trademark of Evernote Corp. in the United States. ONENOTE is a registered trademark of Microsoft Corp. in the United States.

Other approaches convert handwriting immediately to typeset text as it is written and position the typeset text by normal word processing rules. New typeset text is added to the document at the position of the typeset cursor in the underlying application, rather than at the place it is written. Such repositioning of the handwriting into converted typeset according to normal word processing forms is how IMEs and handwriting "keyboards" typically function. In another example, the typeset text is added to the document in a position approximating where it was originally handwritten, but no structure beyond a letter or a word is comprehended. This behavior is seen in the ONENOTE application's convert to text function and in the MYSCRIPT Notes Mobile application. MYSCRIPT is a registered trademark of Myscript Societe Anonyme France in the United States.

A conventional approach to handling handwriting input may also present a static template with lines or other guides that direct the user towards creating a specific document structure while inputting handwritten content. Here, the handwriting is assumed to align with and be structured by the lines, rather than written free-form. Any given stroke must belong to a single line of text, and the lines are consistent across the whole page. Writing on successive lines, without intervening white space, is assumed to be part of the same paragraph. This model is seen in the Stylus Labs WRITE application. WRITE is an unregistered name used in connection with a word processing application for handwriting by Stylus Labs in the United States.

Another conventional approach is to record the handwritten strokes verbatim and thereafter analyze the handwriting content and document structure offline. This model is seen in the ABBYY, OCRFeeder, and OCRopus applications. The analysis and blocking is typically done as a preprocessing step before text recognition. It is an outgrowth of OCR for typeset text documents and as such leans heavily on finding clear-cut graphical boundaries and spacing between blocks. Handwritten documents often do not satisfy this assumption. ABBYY is a registered trademark of Abbyy Software Ltd. Corp. in the United States. OCRFeeder is an unregistered name used in connection with a document layout analysis and optical character (OCR) recognition system by the GNOME Project in the United States. OCRopus is an unregistered name referring to a Python-based OCR package using recurrent neural networks available via GitHub, Inc. in the United States.

An embodiment employs a different approach as compared to conventional approaches in that it analyzes a document of handwritten text as it is being written and displays to the user the interpreted document structure. This permits both a visual display of how the handwritten ink strokes are being interpreted and may also be used to gently guide the writer to extend or correct the structure going forward.

A handwritten document's structure may be discovered by analyzing the blocks of handwriting and their relative positioning while the document is being written. Subtle feedback mechanisms indicate to the writer the derived structure, making it easy to continue within the same structure or correct where it has been misinterpreted.

By way of example, for line spacing, a handwriting recognition engine discerns lines of handwritten text. By allowing the writer to write 2-3 lines of text free-form, then discerning lines of text in the provided ink input, the writer's character height and line spacing can be derived.

Once the line spacing is known for a particular user's handwritten strokes, automatic and disappearing guidelines, displayed for example as faint notebook-style horizontal lines, may be provided by an embodiment to encourage the writer to continue with the same spacing. The guidelines may be shown only in the locality of the pen tip, and may be removed from view when the pen is withdrawn from the screen for an extended period.

After a few lines of handwriting input is provided, e.g., the first 2-3 lines have been written, an embodiment may detect where the user is placing the left and right margins of the handwritten input. An embodiment may therefore detect the line length of the handwritten input and this can be used to define a text block's side boundaries or margins.

Typeset text conversion and wrapping also may be provided by an embodiment. For example, with the top, bottom, left, and right boundaries or margins of a handwriting block known, e.g., corresponding to a paragraph of handwritten text input, the block can be considered a paragraph and converted to typeset text form. The converted text may be aligned with the original handwritten block periphery and wrapped within its side-to-side extents. Thus, an embodiment honors the original intent of the writer by associating typeset text blocks with the detected handwritten block boundaries.

A difficulty solved by an embodiment is whether to include new handwriting ink stroke within an existing block or a new block should be created for it. If the new handwriting falls within the extent of an existing block, the new handwriting is clearly meant to be added to that block. If the new handwriting is written in white-space far from any existing block, e.g., beyond a predetermined distance, a new block may be created. Between these two extremes, an embodiment defines a rule where, if the new handwriting falls within one line-spacing below the current block, or within 1-2 em-widths to the right, the new handwriting is to be added to the existing block. It will be appreciated that such hot-zone or buffer area widths are examples and may be adjusted, either via user configuration or dynamically.

As an aid to understanding this block determining behavior, the hot-zone or buffer area(s) may be visually distinguished, e.g., highlighted with shaded semi-transparent underlay boxes, hatching, or other graphical marks. Alternately, a highlighting may be placed behind the whole area of the existing block (e.g., paragraph block) plus the hot-zone(s). As with disappearing guidelines, the highlighting or other visual indication may be exposed only when the user has the pen near or on the writing surface, only when the user approaches a hot-zone with ink strokes, etc.

An embodiment may automatically format handwritten lists and outlines as well. By way of example, single and multi-level lists may be detected by a consistent indentation of the left margin relative to a preceding block and/or by the writing of a "bullet" type list symbol (e.g., dot, dash, circle, box, check-mark, arrow, etc.) at the start of the list block's first line. Once the first item of a list has been created, horizontal and vertical disappearing guidelines may be shown to the nudge or guide the writer towards continuing the alignment and spacing he or she has started. If further indentation is detected within a list, preference may be given to interpreting the new block as the start of a new sub-list nested within the current list.

To automatically format a table, an embodiment may use an explicit input such as a dedicated table gesture input. For example, because it may not be apparent that the handwritten ink strokes represent a table until a user has written several blocks, table creation may begin with an explicit gesture such as drawing a box or large "T" shape with a pen or finger tip. With a "T" shape gesture, the position of the vertical division between the initial two columns may be set by the "T" gesture's vertical stroke. Once the table framing has been made, each table cell may behave as a paragraph block. Text wraps within the block's boundaries and the column or row grows as the user writes into a hot-zone, e.g., at the bottom and right sides of the existing block.

Table editing may be supported via explicit gestures. For example, dedicated gestures may be provided, using a pen or finger tip, which are used for modifying the structure or content of a table. By way of example, a circle around the outside border of a row or column may select the whole column. As another example, slashing through the same boundary with an ink stroke may cause the row or column to be deleted. A caret-arrow (^) written with the point touching a table boundary, outside or inside the table, may cause a new row or column to be inserted in the direction the arrow points.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a camera, short range wireless devices, a microphone, etc. System 100 often includes a touch screen 170 for data input and display/rendering. System 100 also typically includes various memory devices, for example flash memory 180 and SDRAM 190.

Figure 2:
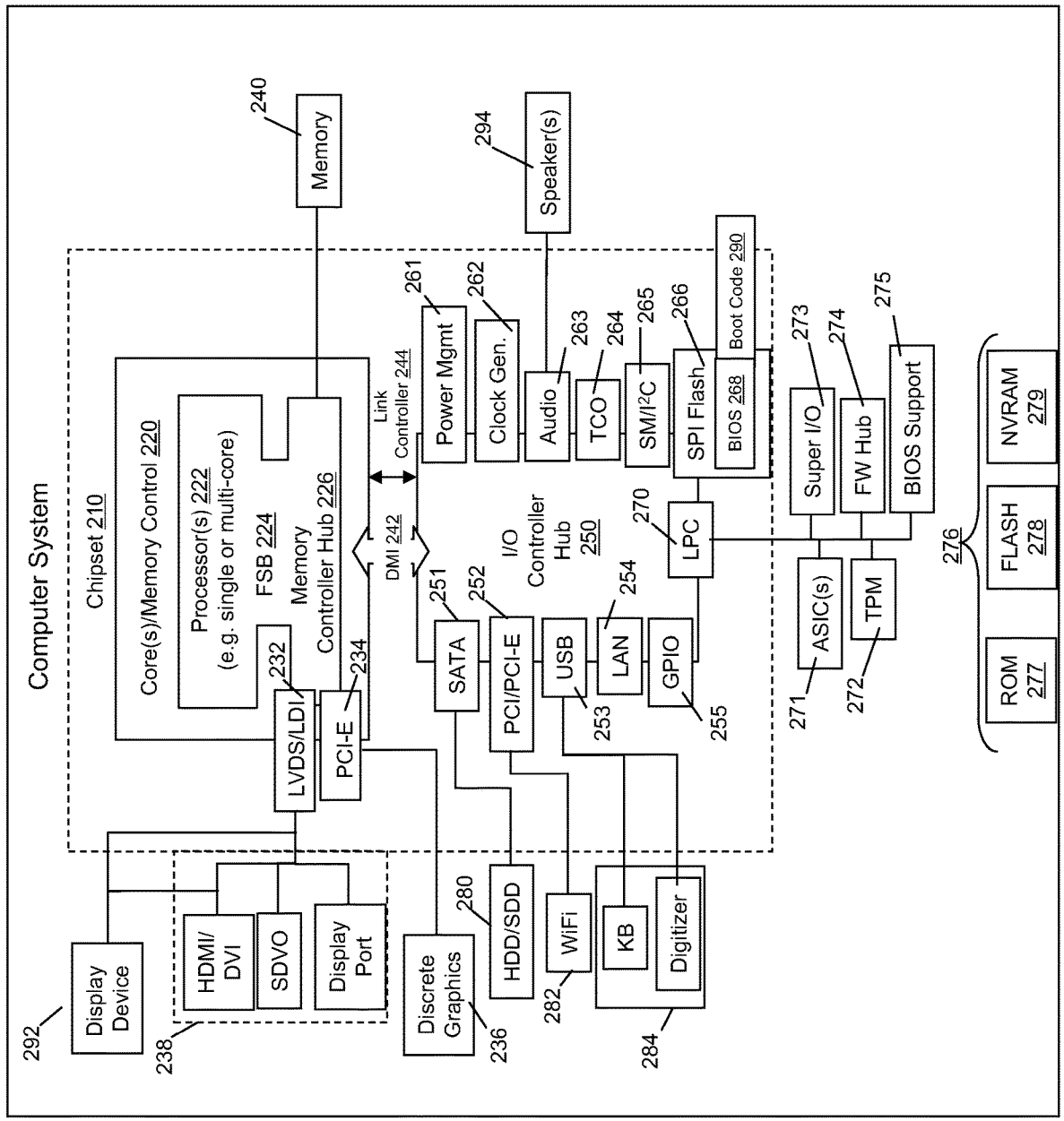
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric input/security devices, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or other electronic devices. Users may employ these devices for various functions, e.g., inputting handwriting strokes as an input modality to an Internet search application, an email application, a text messaging or instant messaging application, with fillable forms, etc. For example, the circuitry outlined in FIG. 1 may be implemented in a tablet or smart phone embodiment, whereas the circuitry outlined in FIG. 2 may be implemented in a laptop personal computer embodiment. In each case, the device may include an input and display device, e.g., a touch screen or the like, which acts to accept handwriting strokes and provides visual displays of input characters, conversions of handwritten characters or strokes to machine text, presentation of candidate handwriting recognition words and the like.

Devices including circuitry such as that outlined in FIG. 1 and/or FIG. 2 (or combinations thereof) may implement an overlay input application, as described herein, which formats typeset text according to the user's handwriting ink strokes. In this regard, FIG. 3 illustrates a general overview of an example overlay input application.

Figure 3:
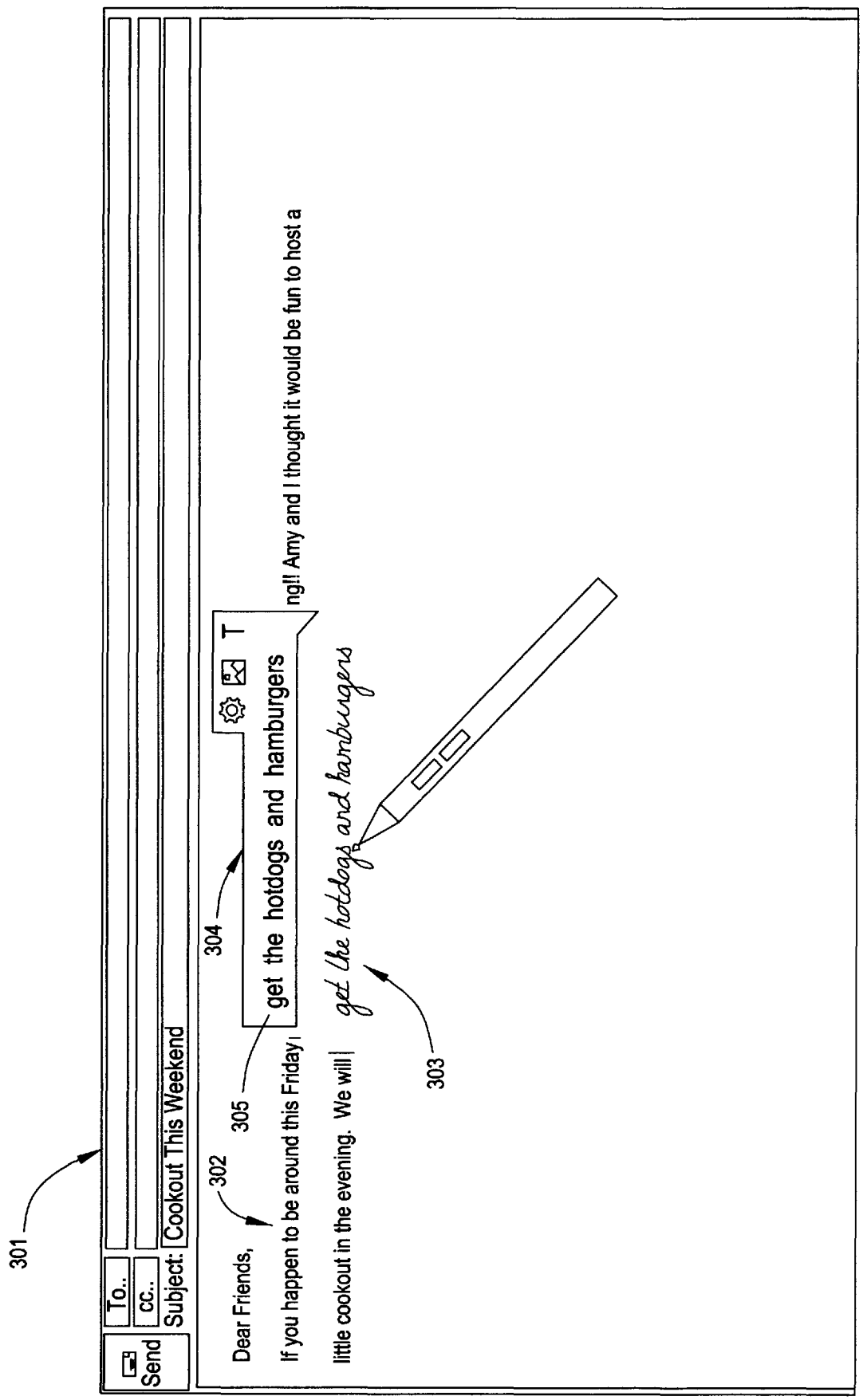
FIG. 3 illustrates an example of inputting handwriting ink strokes in an initial format.

As illustrated in FIG. 3, a user may provide typeset input 302 to an underlying application (which may include an end user application or an operating system (OS)) 301, in this non-limiting example an email application, by way of handwriting input 303. An overlay input application acts to provide an input overlay field that directly overlays the underlying application's 301 input field. The use of an overlay application permits system wide handwriting formatting as described herein, i.e., across multiple applications. However, it should be noted that an overlay application is a non-limiting example implementation used descriptively throughout, and the various embodiments may be provided within the application itself rather than including the functionality within an overlay application.

In the illustrated example of FIG. 3, the overlay input field is provided on top of the email main message body field, as this is where the user is currently writing.

The user's handwriting ink strokes 303, currently appearing as "get the hotdogs and hamburgers" is subjected to an OCR like handwriting recognition processing by a handwriting recognition engine. The overlay input application provides a preview window 304 that, among other things, provides the user with a visual feedback of the typeset words 305 identified from the handwriting ink strokes 303.

The handwriting ink strokes 303 may thus be placed or input into the underlying input field of the email application 301, as indicated for typeset 302. The formatting (e.g., location, logical layout, etc.) of the input typeset 305 derived from the handwriting ink strokes 303 is the subject of an embodiment.

Figure 4:
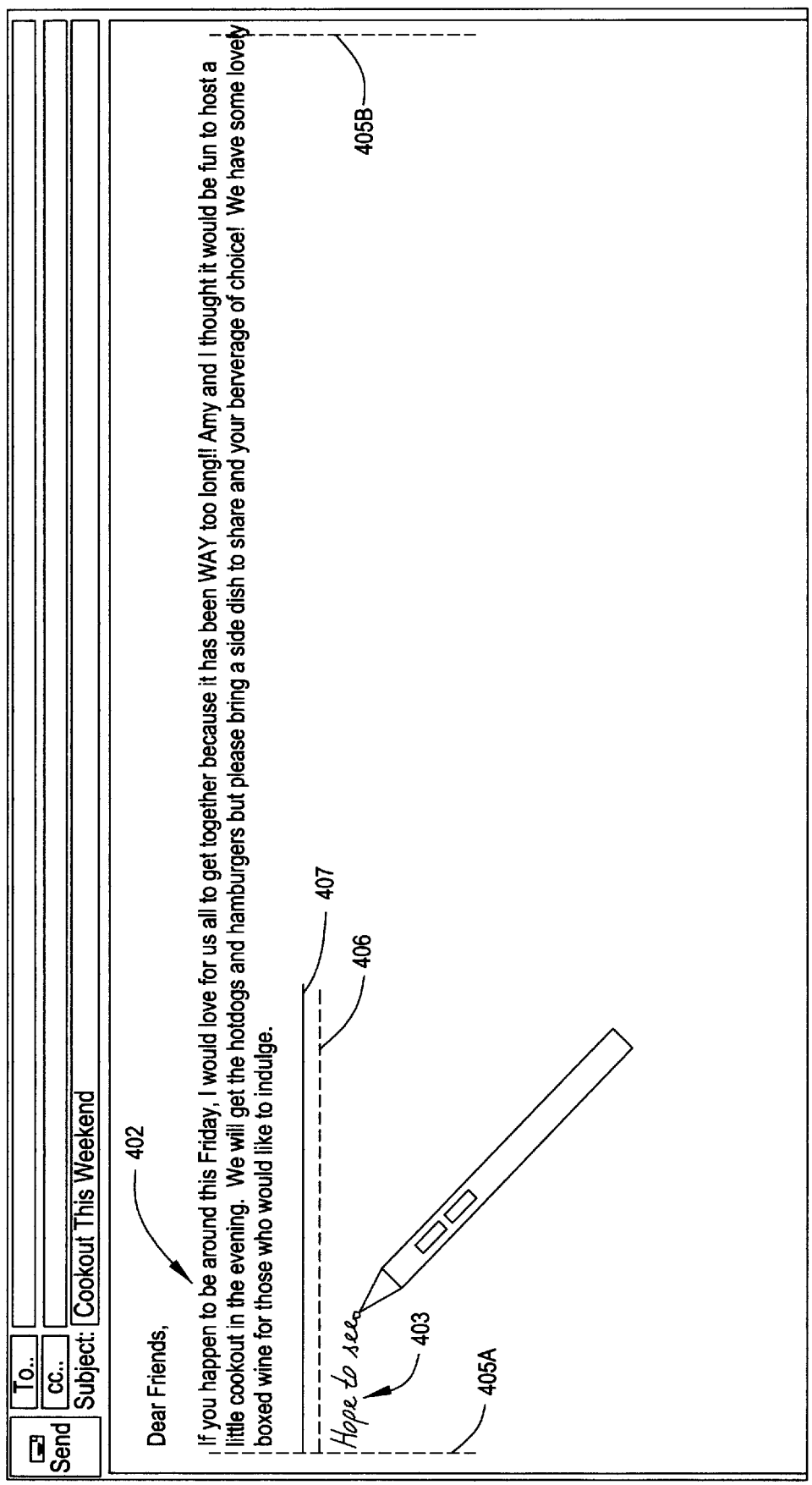
FIG. 4 illustrates an example of providing guidelines and a new block based on handwriting ink strokes.

In FIG. 4, by way of illustrative example, the user has previously provided handwriting ink strokes. The overlay input application has converted these to machine input, along with a formatting, and provided the same to the underlying application to display typeset 402. As may be seen, the typeset "Dear Friends," is off-set from (visually above) the paragraph of text beginning "If you happen to . . . " in FIG. 4. To provide a user with improved formatting of such typeset 402, an embodiment may provide guidelines (405a, 405b, and 407) based on detected handwriting ink stroke characteristics.

In the non-limiting example of FIG. 4 the user's prior ink strokes (not explicitly illustrated) included a lateral or horizontal characteristic, i.e., they began and ended at approximately the location of guidelines 405a and 405b, respectively. Accordingly, an embodiment has input the typeset 402 in the underlying application's input field at these locations. In other words, the user's handwriting ink strokes were used to set the left and right block boundaries or margins for the paragraph of typeset input.

Likewise, the user's handwriting ink strokes included a line spacing that permitted an embodiment to calculate that a next line should be positioned just above guideline 407. This may be determined, for example, using the previous 2-3 lines of handwriting ink strokes input by the user. Similarly, an embodiment may calculate or determine a hot-zone or buffer area, e.g., denoted by 406, within which the user's next handwriting ink stroke should begin if it is to be considered part of the existing block (i.e., the one wrapping the paragraph of typeset beginning with "If you happen . . . "). As described herein, this buffer area or hot-zone may be visually presented to the user to guide the user in providing input to be included or excluded with an initially set block.

As shown in FIG. 4, the user has input new handwriting ink strokes 403 outside of (below) the guideline 407, rather than above, and additionally has placed the handwriting ink strokes 403 outside of buffer or hot-zone (406-407). This positioning of the new handwriting ink strokes "Hope to see . . . " may be used to determine a characteristic associated therewith, i.e., the user has not maintained the previous line spacing but has chosen to input the ink strokes beyond the calculated buffer area 406. This indicates that the user desires to a new block to be created, i.e., for inputting the typeset into a new paragraph.

Figure 5A:
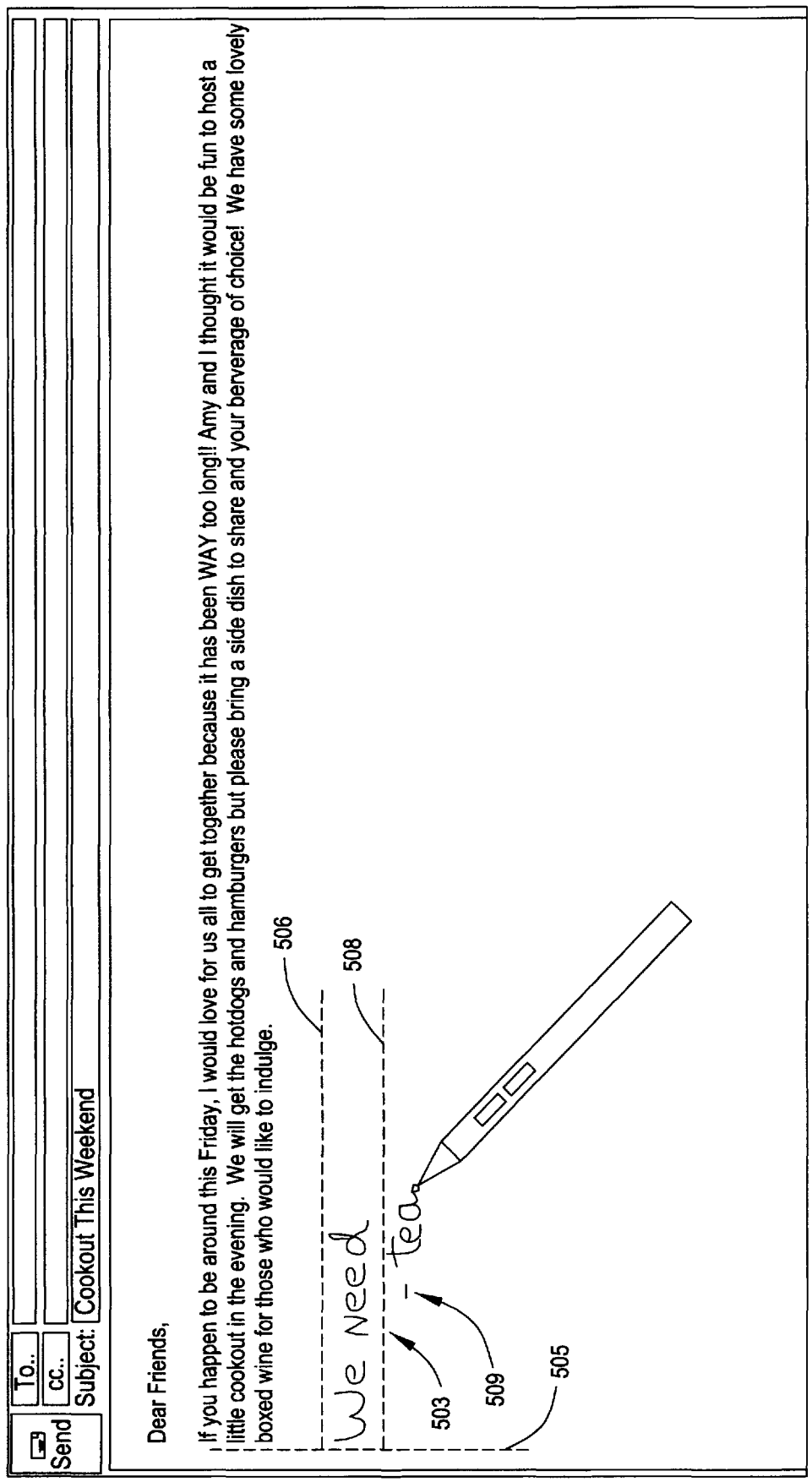
FIG. 5(A-B) illustrates an example of detecting and implementing a formatting change based on handwriting ink strokes.

Turning to the example illustrated in FIG. 5(A-B), an embodiment may adapt to the user's handwriting ink strokes dynamically in many ways. As illustrated in FIG. 5A, the user has provided ink strokes "We Need" and an embodiment has provided guidelines 506 and 508 in response thereto. This indicates to the user that if further ink strokes are provided between guidelines 506 and 508, these ink strokes will be associated with the prior ink strokes, i.e., "We Need."

As shown, the user has decided to provide handwriting ink strokes of "-tea" on the overlay input field below guideline 508. Normally this may indicate that the user wishes to begin a new line of text. Had the user provided the new ink strokes farther below line 508, e.g., outside of a buffer area or hot-zone (not explicitly illustrated in FIG. 5A), this may be characterized by an embodiment as a formatting change wherein a new block is created for the user.

The user has also provided two characteristics with the handwriting ink strokes "-tea" that may be used (alone or in combination) to implement a formatting change of starting a list. The first characteristic is the location of the beginning of the ink strokes, i.e., indented to the right of left block boundary 505. Here it may be appreciated that the indentation may be detected and trigger the beginning of a list.

Figure 5B:
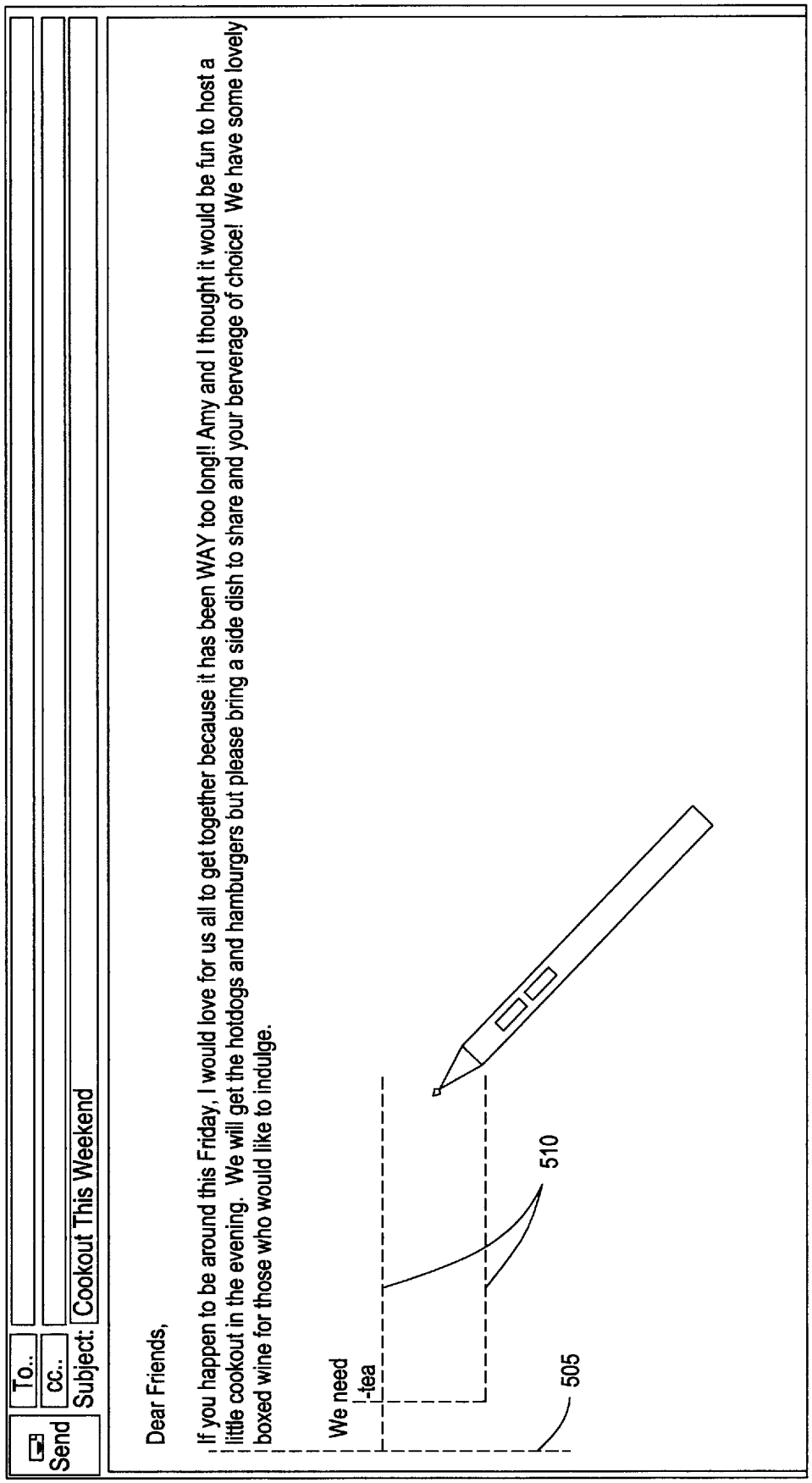

Moreover, the user has provided an explicit gesture input of "-" at 509 that may be used itself to trigger a bulleted list format change. As such, referring to FIG. 5B, an embodiment may implement list formatting such that the typeset conversion of "We Need" and "-tea" are provided as a list. As shown in FIG. 5B, an embodiment handles formatting of "We Need" ink strokes and "-tea" ink strokes. Here, the typeset for "We Need" ink strokes has been located at left most guideline 505, corresponding to the user's ink strokes of "We Need" aligning with that block boundary. However, the typeset for "-tea" is indented for the user in a list form. This permits the user to have his or her handwriting ink stroke formatting honored in the underlying application.

As further illustrated in FIG. 5B, additional guidelines 510 may be provided, i.e., to guide the user in providing further list inputs. Should the user wish to enter a new paragraph, e.g., below the list, he or she need only start the new handwriting ink strokes near boundary block boundary 505 to create a new block of text.

Figure 6B:
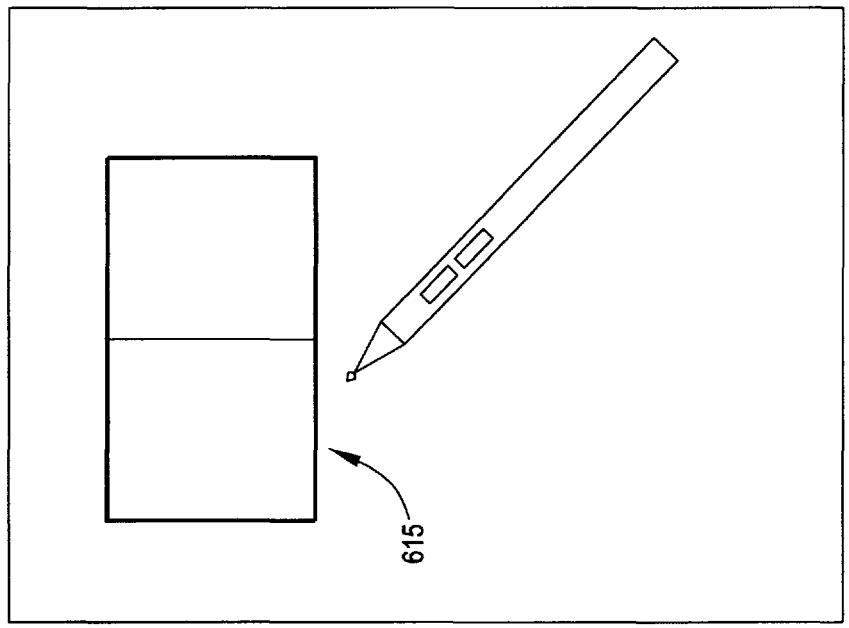
FIG. 6(A-B) illustrates another example of detecting and implementing a formatting change based on handwriting ink strokes.
Figure 6A:
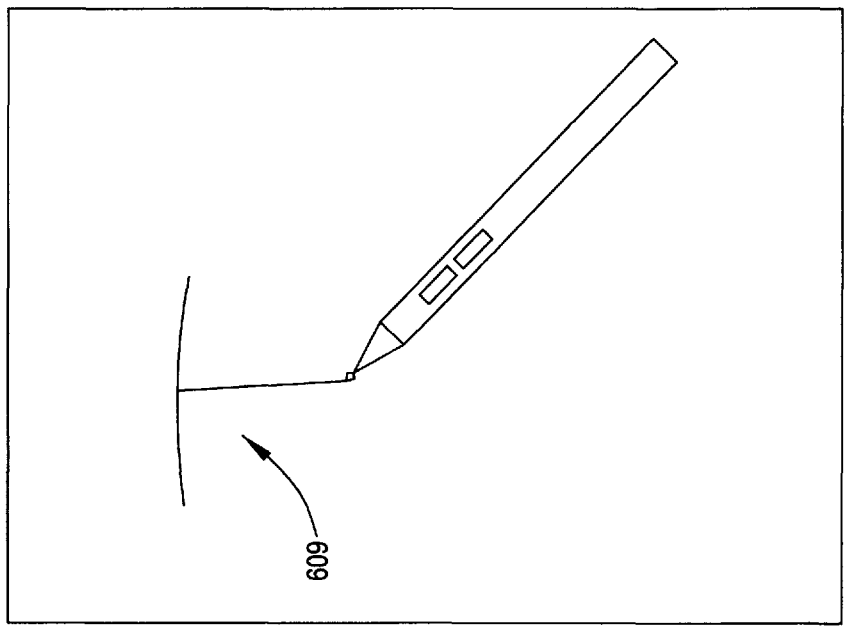

FIG. 6(A-B) illustrates another example of using a gesture input to format handwriting ink strokes. As illustrated in FIG. 6A, the handwriting ink strokes 609 include the characteristic of a predetermined pen gesture, i.e., a "T" shape as described herein. When the user provides this gesture 609 (or other predetermined or configured, dedicated gesture) an embodiment may implement an associated formatting change. By way of example, as illustrated in FIG. 6B, the "T" shaped gesture may be associated with a table format change. Thus, an embodiment may switch from a normal paragraph text block format (and inputting a typeset letter T) to a table format, e.g., including paragraph blocks in each cell of the table 615 for text input.

Figure 7B:
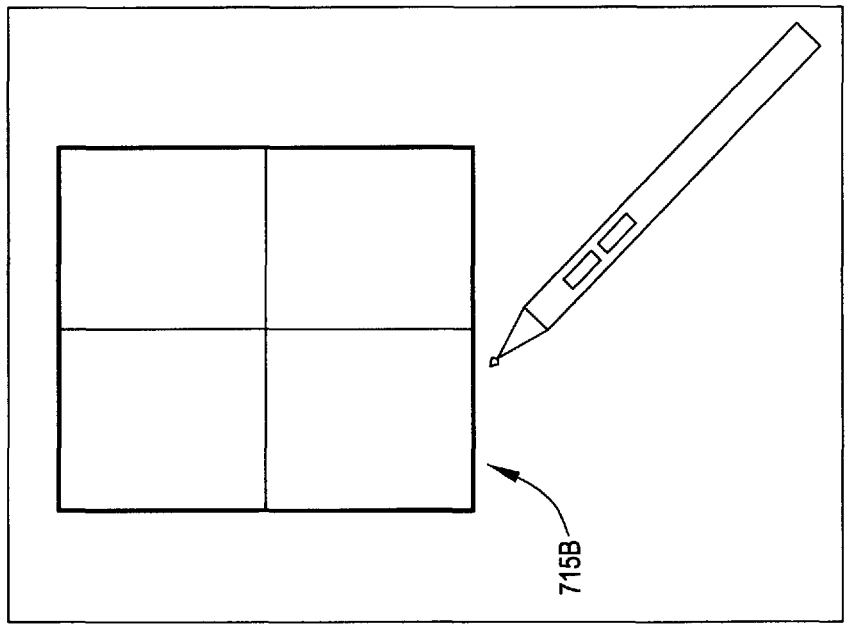
FIG. 7(A-B) illustrates another example of detecting and implementing a formatting change based on handwriting ink strokes.
Figure 7A:
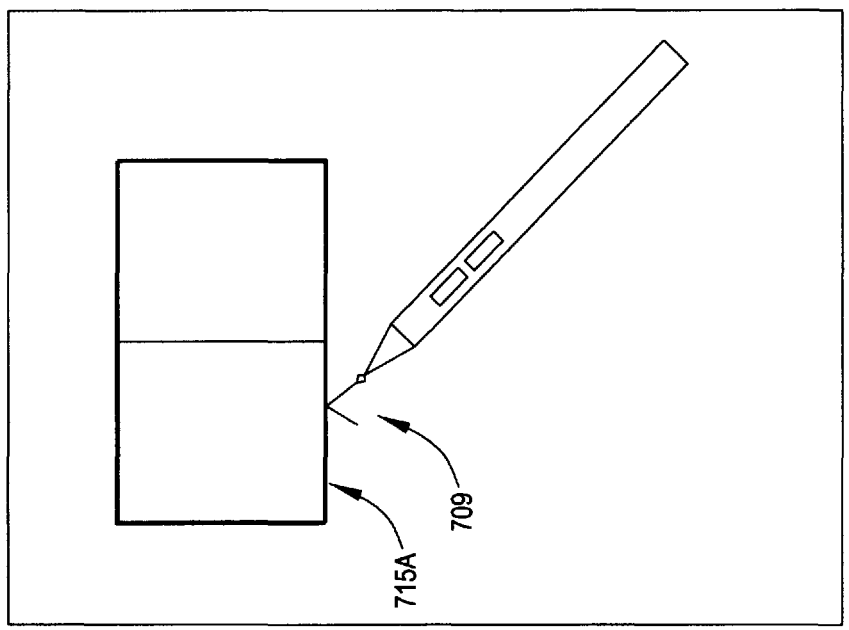

As described throughout, additional gestures may be provided. By way of another example, a user may input a caret or insert gesture, e.g., as illustrated at 709 of FIG. 7A, such that an associated function is implemented. Here, an embodiment has been configured to insert new cells in the table 715a in response to detecting the gesture input 709. Thus, table 715a may be changed to table 715b (FIG. 7B) in response to detecting handwriting ink stroke 709. As has been described, other gestures may be used to implement formatting changes. These gestures may be used to format an existing format structure (e.g., add cells to a table, add items to a list, delete items there-from using a strike through gesture, highlight items, etc.) and/or may be used to format or change substantive content (e.g., delete text, insert text, highlight text, etc.).

Figure 8:
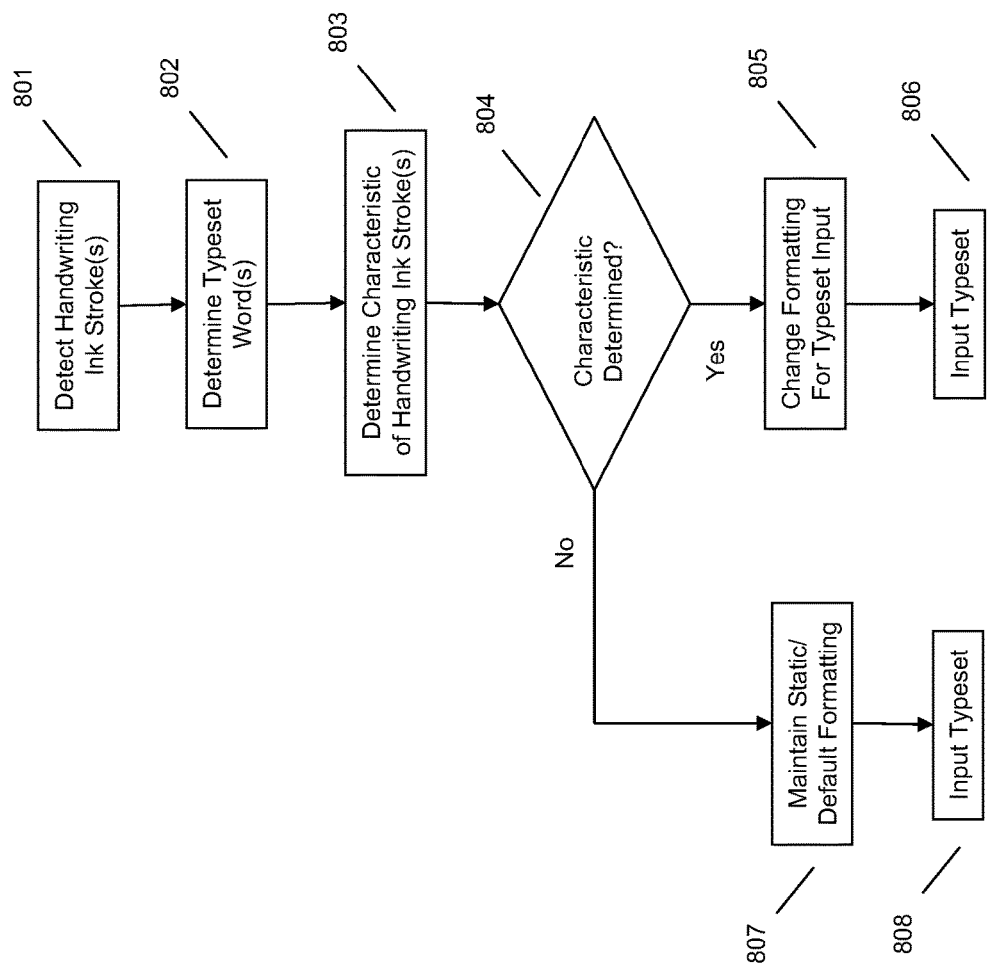
FIG. 8 illustrates an example method of detecting and implementing a formatting change based on handwriting ink strokes.

Accordingly, and referring generally to FIG. 8, an embodiment permits a user to format underlying typeset in-line using handwriting ink strokes. An embodiment analyses characteristic(s) of the ink strokes in order to make determinations as to formatting changes and also provides the user with visual cues regarding what formatting decisions have been made.

As shown in FIG. 8, handwriting ink strokes are detected at 801. These may take the form of letters, numbers, characters, symbols, gestures, a graphic and the like. If typeset words may be identified by a handwriting recognition engine at 802, these may be presented to the user, e.g., in a preview window (illustrated by way of example in FIG. 3).

An embodiment uses the handwriting ink strokes to determine characteristics thereof at 803. As described herein, this may take the form of determining height or width of individual characters or words, spacing therebetween, line spacing characteristics, boundary or margin characteristics, detection of a dedicated gesture input, a combination of the foregoing, etc. If a characteristic is determined at 804, an embodiment may use this characteristic to implement a formatting change at 805. By way of non-limiting example, a user providing handwriting input including an indent or special bullet gesture may be used to implement a change from paragraph block formatting to list formatting, as illustrated in the example of FIG. 5(A-B). This permits an embodiment to input the typeset to the underlying application at 806.

If characteristic(s) are not determined at 804, e.g., the user has simply continued within the same block, continues the same line spacing, has not input a special gesture, etc., an embodiment may maintain a static or default formatting at 807, e.g., continuing to consider the handwriting ink strokes as input into an existing block. Thus, the typeset may be input to the underlying application using the existing formatting at 808. It should be noted, however, that the use of the existing formatting may include some formatting changes. For example, an embodiment may clean-up the handwriting ink strokes' formatting, such as by aligning the line spacing and/or an embodiment may make wholesale changes, such as re-wrapping a paragraph when a user adds new text in the middle or changes the block width, e.g., via moving a block boundary or re-defining the margin settings.

An embodiment therefore represents a technical improvement in formatting handwriting ink strokes for typeset input in an underlying application. This assists the user by more intelligently linking the formatting of the input to the context of handwriting or ink input itself. The various embodiments produce a formatting, including indications thereof, that more closely match the user's intent by taking into consideration the actual characteristics of the ink strokes in determining a format for inputting the typeset.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions that are executed by a processor and stored on a device readable storage medium, referred to herein as a non-signal storage device. A non-signal storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-signal storage device is not a signal, is non-transitory, and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a special purpose information handling device or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   accepting, in an input and display device, a plurality of handwriting ink strokes;
   identifying a plurality of blocks of handwriting ink strokes, each block of handwriting ink strokes comprising a subset of the plurality of handwriting ink strokes;
   determining a structure for a document, wherein the structure is determined based upon a relative position of one of the identified blocks of handwriting ink strokes to another of the identified blocks of handwriting ink strokes and a relative position of the identified blocks of handwriting ink strokes within the document, wherein the relative position is based upon at least one characteristic of the plurality of ink strokes selected from the group consisting of a line spacing and a character height and independent of a position of another block;
   displaying one or more disappearing guidelines corresponding to the determined structure and a buffer area to guide the input to one of the plurality of blocks, wherein the disappearing guidelines match the at least one characteristic and direct provision of additional ink strokes; and
   inputting one or more machine words corresponding to the handwriting ink strokes according to an input formatting of the determined structure.

2. The method of claim 1, wherein:
   the input formatting comprises a line spacing based on the determined line spacing of the plurality of handwriting ink strokes.

3. The method of claim 1, wherein the one or more disappearing guidelines comprise one or more guidelines indicating the line spacing.

4. The method of claim 1, further comprising:
   determining where in the input and display device the plurality of handwriting ink strokes are provided;
   delimiting boundaries around the plurality of handwriting ink strokes; and
   providing an initial block for the plurality of handwriting ink strokes according to the boundaries.

5. The method of claim 4, wherein the identifying a block of handwriting ink strokes comprises determining a characteristic selected from the group of a vertical length of the plurality of handwriting ink strokes and a horizontal length of the plurality of handwriting ink strokes; and
   wherein the determining a structure comprises changing a block boundary of the initial block based on the determined characteristic.

6. The method of claim 5, further comprising providing an indication of the block boundary that has been changed.

7. The method of claim 4, wherein the identifying a block of handwriting ink strokes comprises determining the plurality of handwriting ink strokes fall outside of the initial block.

8. The method of claim 7, further comprising creating a new block for the plurality of handwriting ink strokes.

9. The method of claim 1, wherein the identifying a block of handwriting ink strokes comprises determining a gesture input included in the plurality of handwriting ink strokes, wherein the input formatting is changed according to the gesture input.

10. An apparatus, comprising:
    an input and display device;
    a processor operatively coupled to the input and display device; and
    a memory device that stores instructions executable by the processor to:
    accept, in the input and display device, a plurality of handwriting ink strokes;
    identify plurality of blocks of handwriting ink strokes, each block of handwriting ink strokes comprising a subset of the plurality of handwriting ink strokes;
    determine a structure for a document, wherein the structure is determined based upon a relative position of one of the identified blocks of handwriting ink strokes to another of the identified blocks of handwriting ink strokes and a relative position of the identified blocks of handwriting ink strokes within the document, wherein the relative position is based upon a characteristic of the plurality of ink strokes selected from the group consisting of a line spacing and a character height and independent of a position of another block;
    display one or more disappearing guidelines corresponding to the determined structure and a buffer area to guide the input to one of the plurality of blocks, wherein the disappearing guidelines match the at least one characteristic and direct provision of additional ink strokes; and
    input one or more machine words corresponding to the handwriting ink strokes according to an input formatting of the determined structure.

11. The apparatus of claim 10, wherein:
    the input formatting comprises a line spacing based on the determined line spacing of the plurality of handwriting ink strokes.

12. The apparatus of claim 10, wherein the one or more disappearing guidelines comprise one or more guidelines indicating the line spacing.

13. The apparatus of claim 10, wherein the instructions are executable by the processor to:
  determine where in the input and display device the plurality of handwriting ink strokes are provided;
  delimit boundaries around the plurality of handwriting ink strokes; and
  provide an initial block for the plurality of handwriting ink strokes.

14. The apparatus of claim 13, wherein to identify a block of handwriting ink strokes comprises determining a characteristic selected from the group of a vertical length of the plurality of handwriting ink strokes and a horizontal length of the plurality of handwriting ink strokes; and
  wherein the determining a structure comprises changing a block boundary of the initial block based on the determined characteristic.

15. The apparatus of claim 14, wherein the instructions are further executable by the processor to provide an indication of the block boundary that has been changed.

16. The apparatus of claim 13, wherein to identify a block of handwriting ink strokes comprises determining the plurality of handwriting ink strokes fall outside of the initial block.

17. The apparatus of claim 16, wherein the instructions are further executable by the processor to create a new block for the plurality of handwriting ink strokes.

18. The apparatus of claim 10, wherein to identify a block of handwriting ink strokes comprises determining a gesture input included in the plurality of handwriting ink strokes.

19. The apparatus of claim 18, wherein the input formatting is changed according to the gesture input.

20. A product, comprising:
a storage device having code stored therewith, the code being executable by a processor of an electronic device and comprising:
code that accepts, in an input and display device, a plurality of handwriting ink strokes;
code that identifies a plurality of blocks of handwriting ink strokes, each block of handwriting ink strokes comprising a subset of the plurality of handwriting ink strokes;
code that determines a structure for a document, wherein the structure is determined based upon a relative position of one of the identified blocks of handwriting ink strokes to another of the identified blocks of handwriting ink strokes and a relative position of the identified blocks of handwriting ink strokes within the document, wherein the relative position is based upon a characteristic of the plurality of ink strokes selected from the group consisting of a line spacing and a character height and independent of a position of another block;
code that displays one or more disappearing guidelines corresponding to the determined structure and a buffer area to guide the input to one of the plurality of blocks, wherein the disappearing guidelines match the at least one characteristic and direct provision of additional ink strokes; and
code that inputs one or more machine words corresponding to the handwriting ink strokes according to an input formatting of the determined structure.

* * * * *